Oct. 22, 1968   G. A. AHRENT ET AL   3,406,772
WHEEL TYPE CHAIR-BEDS FOR INVALIDS AND PATIENTS
Filed Aug. 24, 1966   7 Sheets-Sheet 1

United States Patent Office 3,406,772
Patented Oct. 22, 1968

3,406,772
WHEEL TYPE CHAIR-BEDS FOR INVALIDS AND PATIENTS
Gustav Adolf Ahrent, Olle Lennart Siwersson, and Karl Gunnar Tell, Helsingborg, Sweden, assignors to AB Redev., Helsingborg, Sweden
Filed Aug. 24, 1966, Ser. No. 574,606
Claims priority, application Sweden, Sept, 2, 1965, 11,446/65
7 Claims. (Cl. 180—9.24)

ABSTRACT OF THE DISCLOSURE

A wheel type chair-bed with back, seat, and leg-supporting members supported on a U frame base connected to the seat by an intermediate member. Hydraulic pistons connect and move the various members in relation to the base.

---

This invention relates to a wheel type chair-bed for invalids and patients, comprising a base and a seat and back and leg supporting members which are adjustable in relation to the base. Devices of this type suffer from several draw-backs among which can be mentioned a high retailing price, limited usefulness and practicability. Prior art wheel type chair-beds are not suited to cope with any and all situations, and in a building the doors and staircases make it difficult to use the device. These drawbacks are eliminated by the present invention in that the seat, back and leg supporting members are combined into a separate unit which at the front edge of the seat member is pivoted to one end of an intermediate member which has its other end pivoted to the base which in plan view is of U shape.

These and further features of the invention will become apparent from the following detailed description in which reference is made to the accompanying drawings which illustrate a number of embodiments chosen by way of example.

Figure 1:
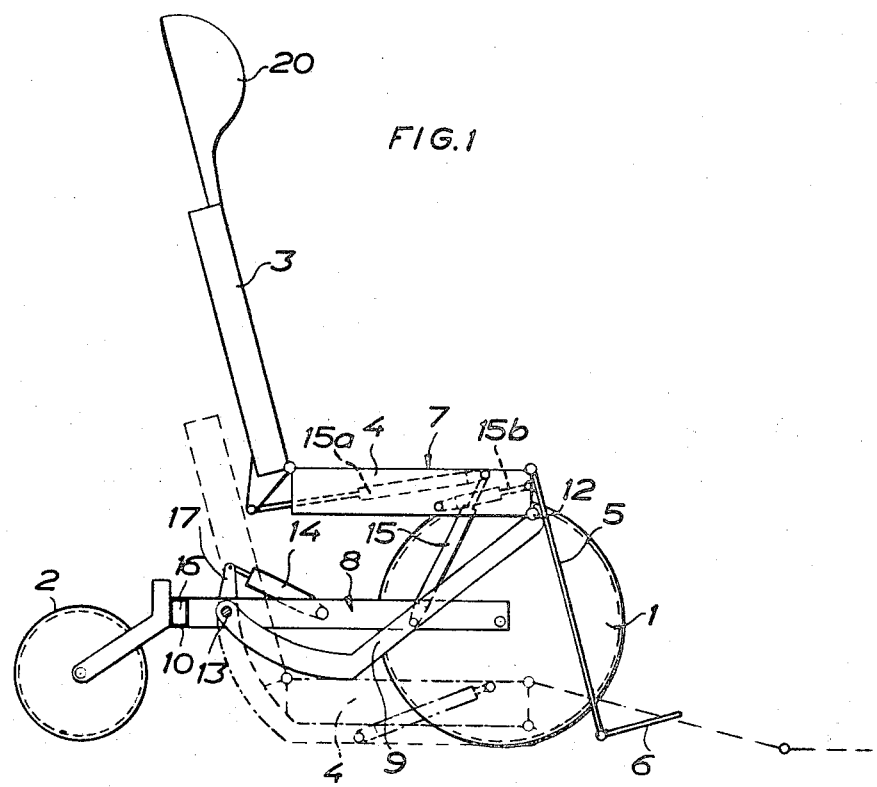
FIG. 1 is a side elevational view of the chair-bed in two different positions of use, one position being shown by full lines, while the other position is indicated by dash and dot lines.
Figure 2:
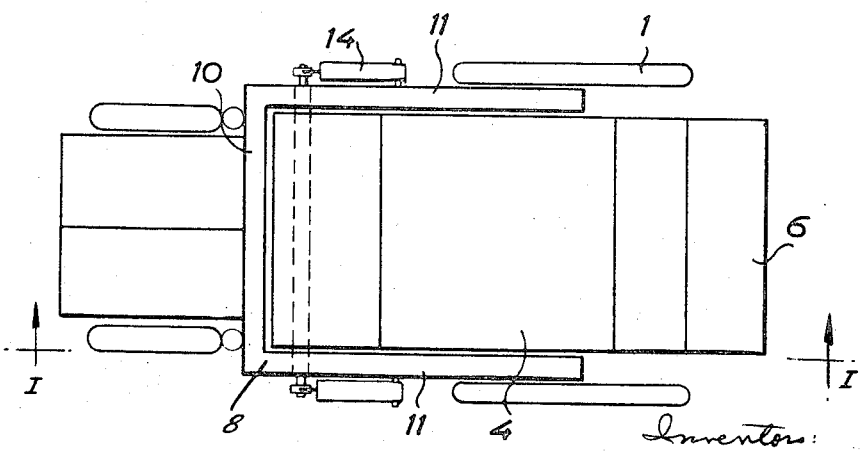
FIG. 2 is a top plan view of the chair-bed.
Figure 3:
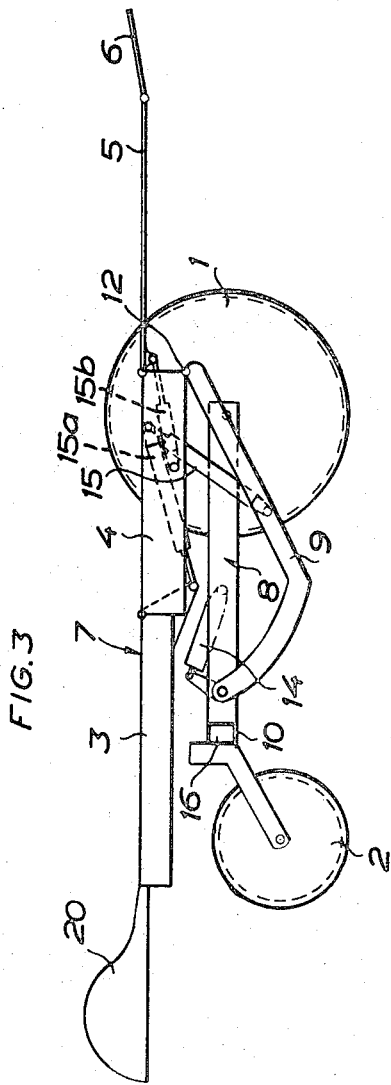
FIG. 3 is a side elevational view of the chair-bed in another position of use.
Figure 4:
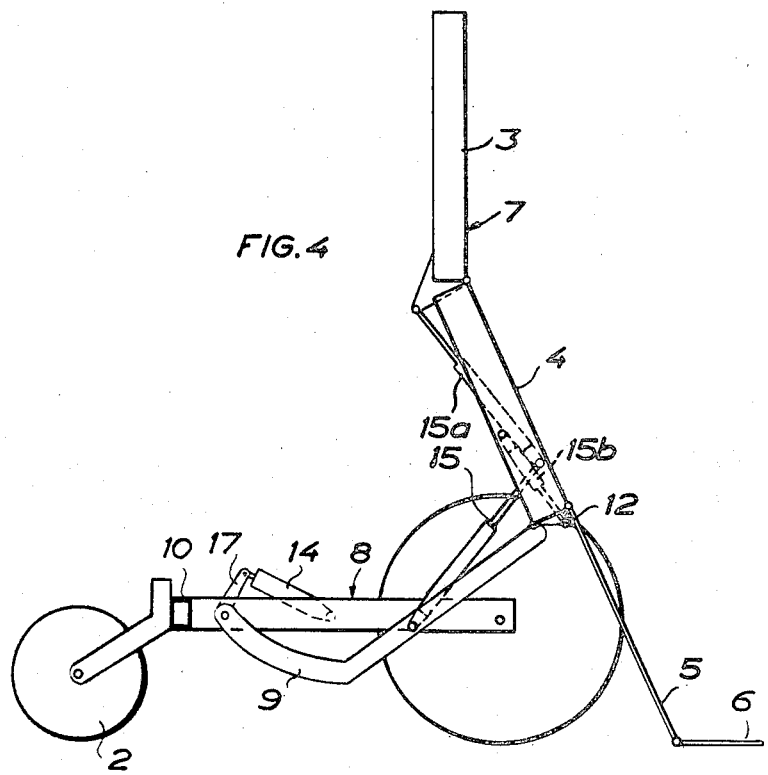
FIG. 4 is a side elevational view of the chair-bed in a further position of use.

The chair-bed shown in FIGS. 1–6 is supported by two pairs of wheels 1 and 2, the wheels 2 being so-called caster wheels. The chair-bed comprises a back supporting member 3, a seat member 4, a leg supporting member 5 and a foot rest 6 which according to the invention are combined into a separate unit generally designated 7. The seat member 4 and the back supporting member 3, the leg supporting member 5 and the foot rest 6 in this unit 7 are adjustable to different sitting and supine positions, being pivotally arranged relative to each other and to a base 8 which is connected with the supporting wheels 1, 2. The seat member 4 and the back supporting member 3, the leg supporting member 5 and the foot rest 6 can also be brought into a position in which the unit 7 constitutes a bed or bedding support, FIG. 3. The unit 7 is movably mounted in the base 8 between upper positions, for example the sitting position shown by full lines in FIG. 1, and lower positions, for example the position shown by dash and dot lines in FIG. 1; in the last mentioned position at least the seat member 4 can be moved in a known manner into immediate proximity to the surface on which the chair-bed is placed.

At the front edge of the said member 4, the unit 7 is pivoted to one end of an intermediate member 9 which in the base 8, of U shape in plan view, is pivoted to said base with its other end close to the transverse limb 10 of the base 8. The intermediate member 9 is of a width less than the free space between the main limbs 11 of the U-shaped base 8, FIG. 2. Thus, the intermediate member 9 is disposed in and, like the seat member 4, adapted to the free space between the main limbs 11 of the U-shaped base 8. In side elevation, the intermediate member 9 is arcuate or angular, having at its ends pivot points 12, 13 for the seat member 4 and the base 8, respectively. Although it is shown as a one-piece unit, the intermediate member 9 may be an arm-pair in which the arms are located adjacent the main limbs 11 of the base 8 but beneath the unit and inwardly of the free longitudinal edges of the seat member 4. The arms of such an arm-pair are parallel and spaced apart. The arms have their one ends pivoted, at 12, to the seat member 4 and their other ends pivoted, at 13, to the base 8. As will appear from the drawing, the U-shaped base 8 comprises means at the free ends of the main limbers 11 and at the transverse limb 10 for mounting the supporting wheels 1, 2. Moreover, piston-cylinder devices 14, 15 are provided, respectively, between the base 8 and the intermediate member 9 and between said intermediate member 9 and the seat member 4. Such an arrangement offers a great many possibilities for an extremely varying and versatile adjustment and fixation of the unit in the adjusted position with regard to the base 8 and thereby to the surroundings and the equipment to be utilized by the invalid or patient or to be employed for his care and comfort.

In addition to the operating and adjusting means in the form of the piston cylinder devices 14, 15 respectively between the base 8 and the intermediate member 9 and between said intermediate member 9 and the seat member 4 of the the unit 7, piston cylinder devices 15a and 15b are provided also respectively between the back supporting member 3 and the seat member 4 and between said seat member 4 and the leg supporting member 5 and possibly also between said leg supporting member 5 and the foot rest 6. However, these further operating and fixation means need not necessarily be hydraulically operated but can be made adjustable and fixable by other optional means, such as mechanical means.

At hydraulic operation of the piston-cylinder devices 14, 15 a suitable pumping device can be provided at a convenient location in the chair-bed, and the base 8 can be a hollow beam, the cavity 16 of which contains a supply of hydraulic fluid. The piston-cylinder device 14 is arranged in the space behind one of the wheels 1 in order not to increase the total width of the chair-bed and is connected to the intermediate member 9 by means of an arm 17 which is fixedly connected to said member 9. A piston-cylinder device provided on the opposite side of the chair-bed can be formed either as a hydraulic unit corresponding to the piston-cylinder device 14 or as a spring mechanism for storing and supplying driving power to facilitate adjustment of the back supporting member 3, the leg supporting member 5, the foot rest 6 and the seat member 4 into desired positions. The same may apply to the piston-cylinder device 15 which can be supplemented with a similar spring mechanism.

Figure 5:
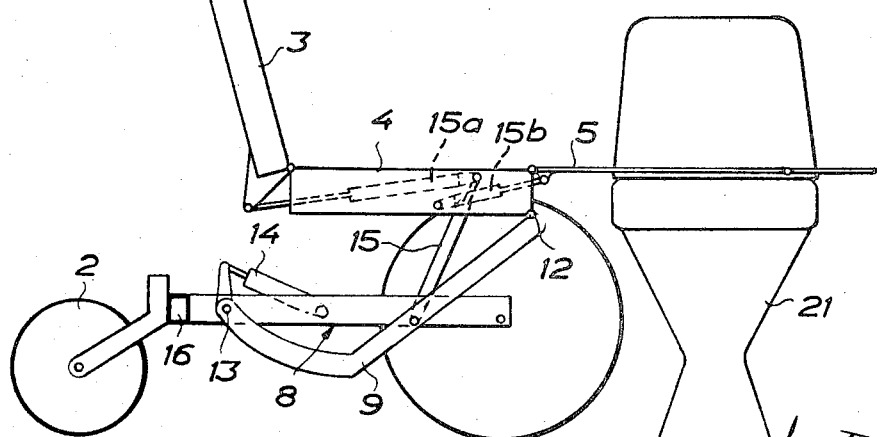
FIG. 5 is a side elevational view of the chair-bed in still another position of use.
Figure 6:
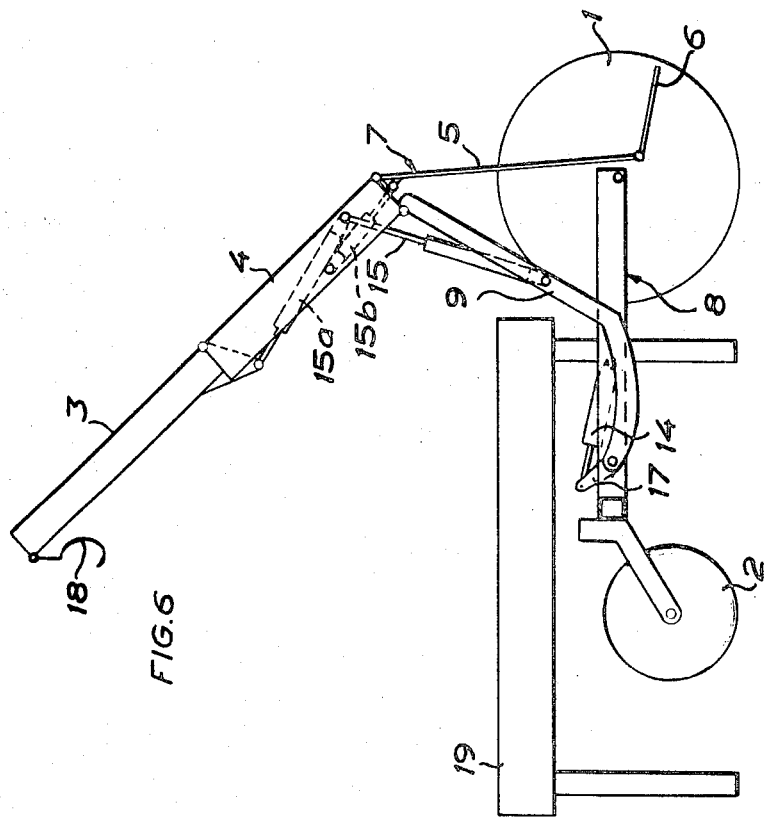
FIG. 6 is a side elevational view of the chair-bed in still a further position of use.

As will appear from the drawings, the chair-bed is easily adjusted and locked in different positions of use which are shown by way of example only since a further number of other positions of use can be obtained to permit the invalid or his nurse to positively cope with every situation that may arise, either the chair-bed is operated by the invalid himself or by his nurse. In FIG. 6 the chair-bed is shown equipped with a lifting hook 18 which when the chair-bed is utilized as a lifting means permits lifting and turning the patient in a bed or on a treatment table 19. The chair-bed in FIG. 1 is shown equipped with a neck support 20 and can, of course, be provided also with arm rests or other supports not shown in FIGS. 1–6. Such supports should lie entirely within the lateral edges of the seat member 4 to allow unimpeded adjustment thereof and the adjoining parts of the unit 7 from a position above the base 8 to a position beneath said base, and vice versa. FIG. 5 shows a water closet 21. Besides, the position in which the chair-bed is illustrated in FIG. 5 is suitable for transferring the invalid to a car, either such transfer is effected by the invalid himself or with the aid of other people.

Figure 7:
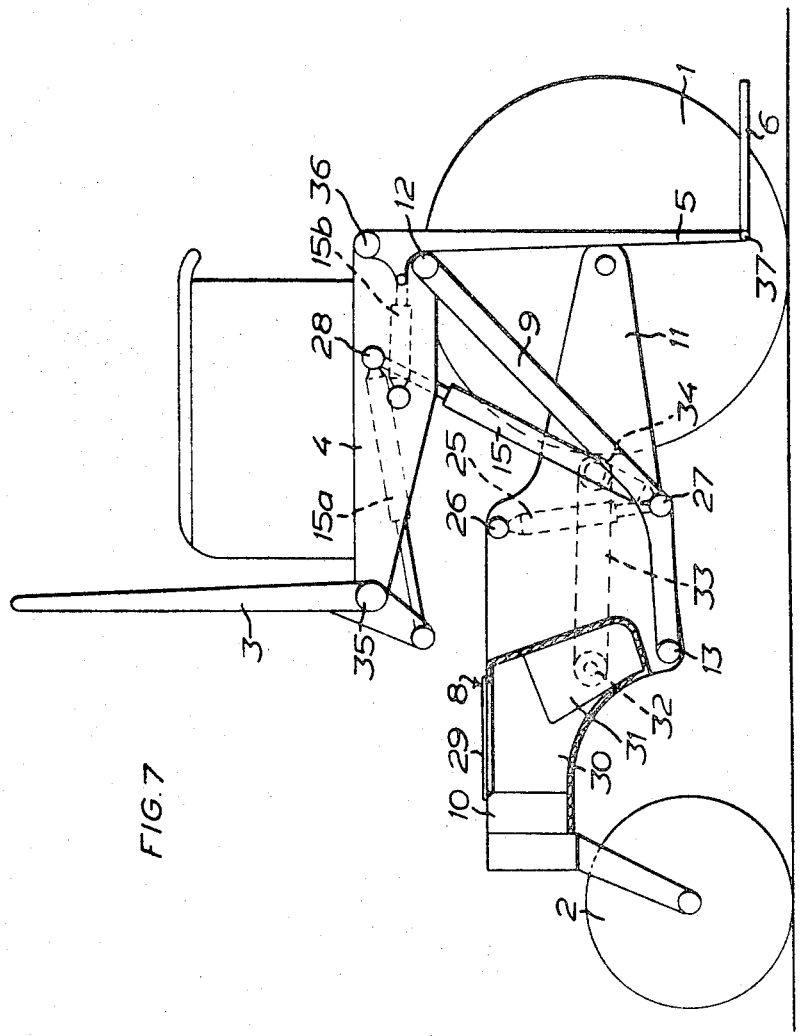
FIG. 7 is a side elevational view corresponding to FIG. 1 and showing a modified embodiment of the invention.
Figure 8:
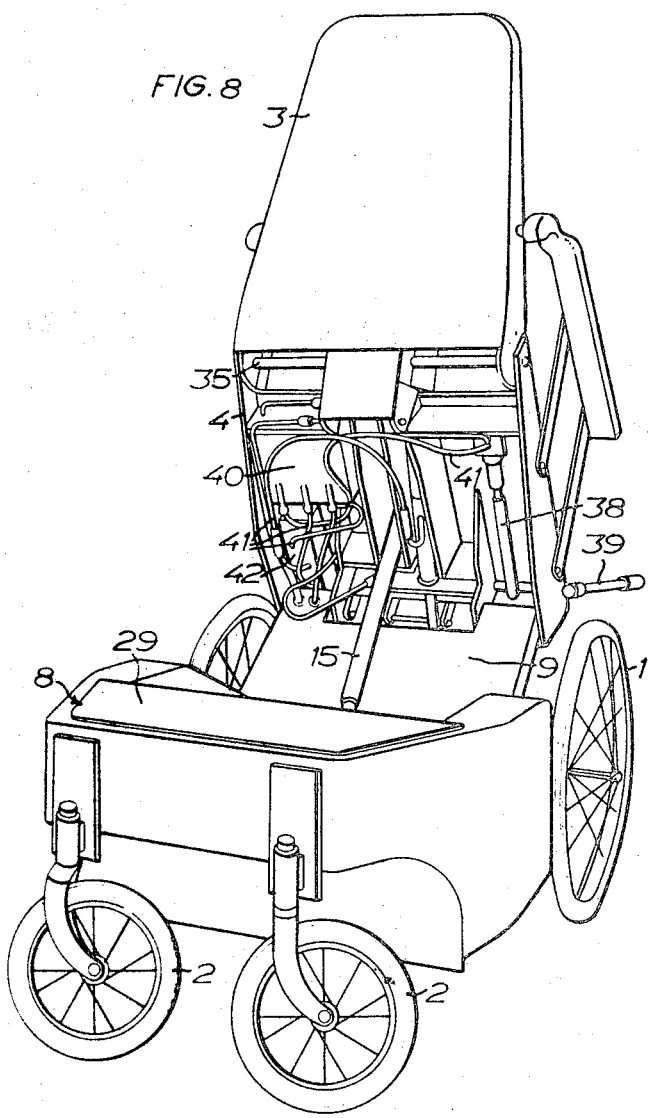
FIG. 8 is a rear view of the modification shown in FIG. 7 substantially in the position shown in FIG. 4.

In the modification shown in FIGS. 7 and 8, a piston-cylinder device 25 corresponding to the piston-cylinder device 14 is mounted between the base and the intermediate member 9 and hingedly connected by hinges 26 and 27 to the base 8 and the intermediate member 9, respectively. The hinge 27 is mounted in the angle of the intermediate member 9 which has angular shape as seen from the side. Also connected to the hinge 27 is the piston-cylinder device which is pivoted to the seat member 4 at 28. In this modification, the hollow beam construction of the base 8 is more pronounced than in the embodiment earlier described, and a space 30 located adjacent to the transverse limb 10 and between the main limbs 11 can be utilized to accommodate a motor 31 (which is only diagrammatically shown) for the propulsion of the chair-bed. Said space 30 can be closed by means of a cover 29. Extending from the drive shaft 32 of the motor 31 is a transmission 33 which is connected to a friction roller 34 which engages the periphery of the wheel 1 and when the motor 31 is in operation permits the chair-bed to be propelled. In this embodiment, a hinge between the seat member 4 and the back supporting member 3 is designated 35, a hinge between the seat member 4 and the leg supporting member 5 is designated 36, and a hinge between the leg supporting member 5 and the foot rest 6 is designated 37.

In the embodiment shown in FIGS. 7 and 8, a pump 38 is disposed in the seat member 4, like in all the preceding embodiments. The pump 38 is provided with a lever 39 mounted on the outer side of the seat member 4, and by moving the lever to and fro the pump 38 is made operative to pump pressure medium from the supply in the base 8 or from the supply 40 in the seat member 4 in the embodiment according to FIGS. 7 and 8 to the various piston-cylinder devices 15a, 15b and 25. The flow of pressure medium from the operating pump 38 can be passed through conduits 41 and a valve mechanism 42 to the desired piston-cylinder device or devices which, when made operative, bring about the desired adjustment of unit 7 and the seat member 4, the back supporting member 3, the leg supporting member 5 and the foot rest 6, comprised therein. The valve mechanism 42 has a setting means (not shown) which can easily be reached from the upper side of the seat member 4.

Figure 9:
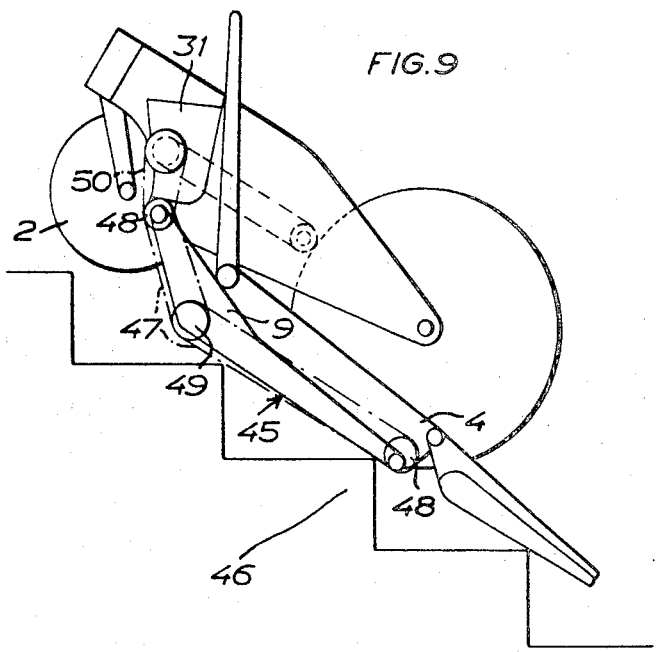
FIG. 9 is a view of a further modification of the invention in one position of use.

In the embodiment shown in FIG. 9, the chair-bed according to the invention is equipped with a track-laying mechanism 45 to permit the chair-bed to ascend or descend a flight of stairs 46. The mechanism 45 comprises a pair of chains 47 or belts which are placed around sprockets 48 and a return sprocket 49 so that the respective chain or belt 47 will have two runs travelling in the same plane at an angle to each other. The sprockets 48, 49 are mounted in the intermediate member and take part in the movements thereof, thus being protected and inoperative up to the moment when the track-laying mechanism is moved to operative position by lowering of the intermediate member 9 and the seat member 4 to the lowermost position shown by dash and dot lines in FIG. 1. The chains or belts 47 have claws (not shown) by which the chains or belts can firmly engage the stairs 46, thereby ensuring safe propulsion of the chair-bed up or down relatively steep flights of stairs with the invalid or patient remaining seated on the seat member 4. Through a transmission 50 the track-laying mechanism 45 is drivably connected with the motor 31. As will appear from FIG. 9, the wheels 2 can be swung aside to facilitate the climbing movement of the chair-bed.

The leg supporting member 5 of the chair-bed according to the invention can be used by the invalid or patient to lift a relatively heavy or large object and to convey the object, in its lifted position, by means of the chair-bed, while the patient himself remains seated on the seat member 4.

Figure 10:
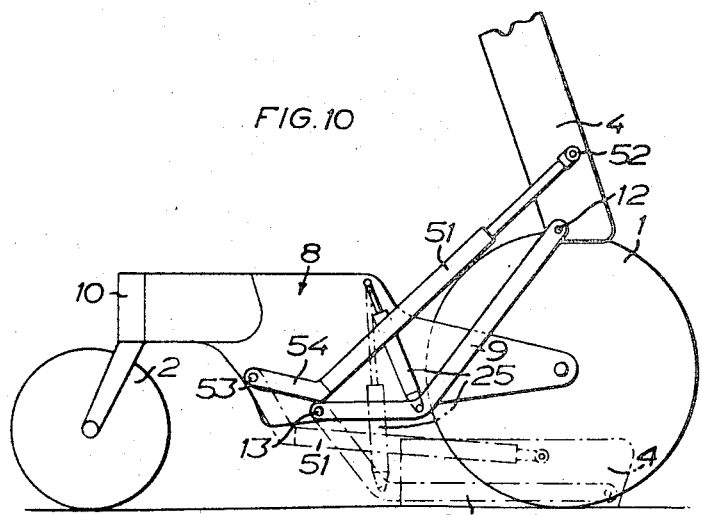
FIG. 10 is a view of still another modification of the invention.

In the modification of the invention illustrated in FIG. 10, a piston-cylinder device 51 is provided which has one end pivoted to the seat member 4 at 52 and the other end pivoted to the base 8 at 53 by means of an angular connecting member 54. This piston cylinder device 51 combines the function of the piston-cylinder device 15 in the earlier embodiments with the further function of serving as a link in a parallel guide mechanism for the seat member 4, wherein the intermediate member 9 constitutes the other link. For example, if the piston-cylinder device 51 is held in its retracted position shown in FIG. 10 by dash and dot lines, together with the horizontal seat member 4 and the intermediate member 9, and only the piston-cylinder device 25 is operated for moving the seat member 4 vertically, the seat member 4 substantially remain in its horizontal position, irrespective of the height position imparted to it by the piston-cylinder device 25. This has been indicated in FIG. 10 where the seat member is also indicated by dash and dot lines in a further position.

What we claim and desire to secure by Letters Patent is:

1. A wheel type chair-bed for invalids and patients comprising:
   a base having a U shape in plan view open forwardly and formed by longitudinal members connected by a transverse member,
   seat, back, and leg-supporting members forming a separate unit, said unit being adjustable in relation to said base,
   an intermediate member having one end pivotally connected to said base and the other end pivotally connected to the edge of said seat member adjacent said leg-supporting member,
   said seat member connected by said intermediate member for vertical movement between and to a position below said longitudinal members of said base.

2. The wheel type chair-bed in accordance with claim 1, further characterized by:
   said intermediate member disposed in the space between said longitudinal members.

3. The wheel type chair-bed in accordance with claim 1, further characterized by:
   said intermediate member having an arcuate shape.

4. The wheel type chair-bed in accordance with claim 1, further characterized by:
   means for mounting the supporting wheels at the free ends of said U shaped base and to said transverse member.

5. The wheel type chair-bed in accordance with claim 1, further characterized by:
piston-cylinder devices provided respectively between said base and said intermediate member and between said intermediate member and said seat.

6. A wheel type chair-bed according to claim 1 wherein piston-cylinder devices are provided respectively between the base and the seat and between the base and the intermediate member, one of said piston-cylinder devices being adapted to form a link in a parallel guide mechanism for the seat, said intermediate member constituting the other link of said parallel guide mechanism.

7. A wheel type chair-bed according to claim 1 wherein the intermediate member is equipped with flexible drive means for the propulsion of the chair-bed.

References Cited
UNITED STATES PATENTS

| | | | |
|---|---|---|---|
| 1,739,260 | 12/1929 | Roe | 280—5.2 |
| 2,322,683 | 6/1943 | Costa | 297—69 |
| 2,694,437 | 1/1954 | Glaser. | |
| 3,112,001 | 11/1963 | Wise | 280—30 X |
| 3,147,039 | 9/1964 | Smith | 5—86 X |
| 3,215,469 | 11/1965 | Wamsley. | |
| 3,276,531 | 10/1966 | Hale | 180—9.24 |

RICHARD J. JOHNSON, *Primary Examiner.*